United States Patent [19]
Richmond et al.

[11] Patent Number: 5,514,357
[45] Date of Patent: May 7, 1996

[54] STABILIZED MAGNESIUM HYDROXIDE SLURRY

[75] Inventors: Alvin Richmond; Robert J. Gutowski, both of Manistee, Mich.

[73] Assignee: Martin Marietta Magnesia Specialties Inc., Raleigh, N.C.

[21] Appl. No.: 46,283

[22] Filed: Apr. 15, 1993

[51] Int. Cl.$^6$ .................. C01F 5/02; C01F 5/34; C09C 1/02
[52] U.S. Cl. .................. 423/265; 423/636; 106/471; 252/310; 252/313.1; 23/304
[58] Field of Search .................. 423/635, 636, 423/265; 106/471; 252/310, 313.1; 23/304

[56] References Cited

U.S. PATENT DOCUMENTS

| | | | |
|---|---|---|---|
| 2,087,089 | 7/1937 | Hall | 423/635 |
| 2,335,373 | 11/1943 | Woodward | 210/62 |
| 3,658,473 | 4/1972 | Sese | 23/304 |
| 3,692,898 | 9/1972 | Gormaw et al. | 424/158 |
| 3,957,674 | 5/1976 | Sano et al. | 252/182 |
| 4,147,627 | 4/1979 | Goodman | 210/58 |
| 4,155,741 | 5/1979 | Scher et al. | 71/65 |
| 4,164,521 | 8/1979 | Goodman | 252/187 |
| 4,166,040 | 8/1979 | Goodman | 252/180 |
| 4,166,041 | 8/1979 | Goodman | 252/180 |
| 4,230,610 | 10/1980 | Falcione et al. | 260/29.6 |
| 4,375,526 | 3/1983 | Zupanovich et al. | 524/436 |
| 4,412,844 | 11/1983 | Collins et al. | 44/51 |
| 4,430,248 | 2/1984 | Rey | 252/313.1 |
| 4,548,733 | 10/1985 | Vincent | 252/310 |
| 4,743,396 | 5/1988 | Fong | 252/313.1 |
| 5,076,846 | 12/1991 | Buri et al. | 106/471 |

FOREIGN PATENT DOCUMENTS

| | | | |
|---|---|---|---|
| 49-61090 | 6/1974 | Japan | 423/635 |
| 61-291413 | 12/1986 | Japan | C01F 5/14 |

Primary Examiner—Gary P. Straub
Attorney, Agent, or Firm—Gay Chin; Bruce M. Winchell; Carlos A. Nieves

[57] ABSTRACT

A method for producing a stabilized magnesium hydroxide slurry comprising physically deflocculating the magnesium hydroxide solids in a starting slurry to produce a stabilized magnesium hydroxide slurry. Depending on the chloride level of the starting slurry, a cationic polymer may be added to the slurry. Optionally a thickening agent may be added to the deflocculated slurry. Also disclosed is a stabilized magnesium hydroxide slurry produced by the method which may be transported and stored without substantial agglomeration of the magnesium hydroxide solids.

19 Claims, 1 Drawing Sheet

STABILIZED MAGNESIUM HYDROXIDE SLURRY

FIELD OF THE INVENTION

The present invention relates to a stabilized magnesium hydroxide slurry that may be transported, pumped and/or stored without substantial agglomeration. The present invention also relates to a method for producing the stabilized magnesium hydroxide slurry.

BACKGROUND OF THE INVENTION

Magnesium hydroxide, $Mg(OH)_2$, is widely used in industry as a neutralizing agent, as a gas absorber, in waste water treatment, in power plant applications and in other utilities. Magnesium hydroxide has also recently replaced sodium hydroxide in many applications due to the increased price of sodium hydroxide and to shortages of sodium hydroxide.

Magnesium hydroxide, may be derived from three basic sources: seawater, well brines and magnesite ore. In a typical process a magnesium hydroxide slurry is produced from the chemical reaction of dolime ($CaO \cdot MgO$) and well brine. The well brine comprises primarily calcium chloride but also includes magnesium chloride. The chemical reaction of dolime and well brine produces a slurry of magnesium hydroxide in a chloride containing liquor. The slurry is then further processed to reduce the chloride level, and concentrated to approximately 40–55% magnesium hydroxide solids. If desired the magnesium hydroxide slurry may be further processed in various types of furnaces to produce a magnesium oxide product.

The viscosity of a magnesium hydroxide slurry increases with increasing magnesium hydroxide solids loading (concentration) and does so dramatically as the loading exceeds 45%. Under normal conditions the 40–55% solids magnesium hydroxide slurry will have a relatively high viscosity, possibly between 3000 and 4000 centipoise. In many heretofore known magnesium hydroxide slurries, if agitation of the slurry is absent, the solids tend to settle and agglomerate. The settling and agglomeration results in an extremely hard mass which, after a period of time, is extremely difficult, if not impossible, to re-suspend.

A magnesium hydroxide slurry having these characteristics could not be shipped for long distances, or stored for more than a short time without agitation without the slurry ceasing to be in pumpable form. Furthermore, even if a portion of the transported slurry could be transferred from the transport vehicle, generally a truck or rail car, the hard mass of agglomerated slurry ("heel") remaining in the vehicle would could not easily be resuspended and therefore would need to be manually removed from the transport vessel by shoveling and/or scraping. Additionally, the portion of the slurry that could be transferred would need to be maintained under substantially constant agitation to prevent agglomeration of the solids.

For these and other reasons, it would be advantageous to have a stable, high solids content, magnesium hydroxide slurry that may be transported, pumped and/or stored without substantial solids agglomeration. It would also be advantageous to have a stable, high solids content, magnesium hydroxide slurry that would permit any solids that did agglomerate to be easily resuspended. Further, it would be advantageous to have a stable, high solids content, magnesium hydroxide slurry that could be transported in trucks or rail cars for a period of up to 14 days and evacuated from the truck or rail car leaving only a minimal "heel" of agglomerated solids.

The present invention achieves these advantages as well as other advantages that will be apparent from the following description.

SUMMARY OF THE INVENTION

The present invention is directed to a method for producing a stable magnesium hydroxide slurry, and the slurry produced by the method.

According to the method of the present invention, a magnesium hydroxide slurry, produced by conventional methods such as from well brines, having the desired solids content, generally between 50 and 65% solids, by weight, is subjected to a physical deflocculation step to produce a stabilized magnesium hydroxide slurry. Depending on the chloride level of the starting magnesium hydroxide slurry, the method may also include treating the slurry with a cationic polymer to lower the viscosity of the slurry to a point which enables the physical deflocculation step to proceed to substantial completion. In a preferred method of the present invention, a thickening agent is added to the slurry during or after the physical deflocculation step.

Physical deflocculation refers to a process wherein the magnesium hydroxide solid particles are subjected to mechanical forces which break up small loose agglomerations of the particles.

The method of the present invention advantageously produces a stabilized magnesium hydroxide slurry that can have a magnesium hydroxide solids content of up to 65%, by weight, and can be shipped long distances for periods of 7–14 days without agitation and arrive in a state wherein the slurry can be removed from the transporter by pumping, pressure or gravity without leaving a significant "heel" in the transport container.

The method of the present invention also advantageously produces a stabilized magnesium hydroxide slurry that will remain stable and substantially free of agglomerated magnesium hydroxide solids for an indefinite period of time with agitation, or for at least 30 days without agitation.

The method of the present invention further advantageously produces a stabilized magnesium hydroxide slurry that will not plug up transfer lines and/or metering pumps.

The stabilized magnesium hydroxide slurry of the present invention is characterized by having a magnesium hydroxide solids content of 50 to 65%, by weight wherein substantially all of the solids are deflocculated. Preferably the stabilized magnesium hydroxide slurry of the present invention also has one or more of the following properties: a viscosity of 50–1000 centipoise (cps); a density of 1.4–1.6 grams/cubic centimeter (g/cc); a mean particle size of the magnesium hydroxide solids of 1.7–5.0 microns, preferably 3–4 microns; and a chloride level of 0.30–0.75% by weight on a MgO basis, preferably 0.35–0.60 by weight on a MgO basis. The stabilized magnesium hydroxide slurry may also include 1 to 5000 parts per million (ppm) of a cationic polymer. A preferred stabilized magnesium hydroxide slurry of the present invention additionally includes 1 to 100 ppm of a thickening agent.

The stabilized magnesium hydroxide slurry of the present invention has the aforementioned advantages as well as other advantages that will be apparent to those of ordinary skill in the art from the following more detailed description.

DETAILED DESCRIPTION OF THE INVENTION

Figure 1:
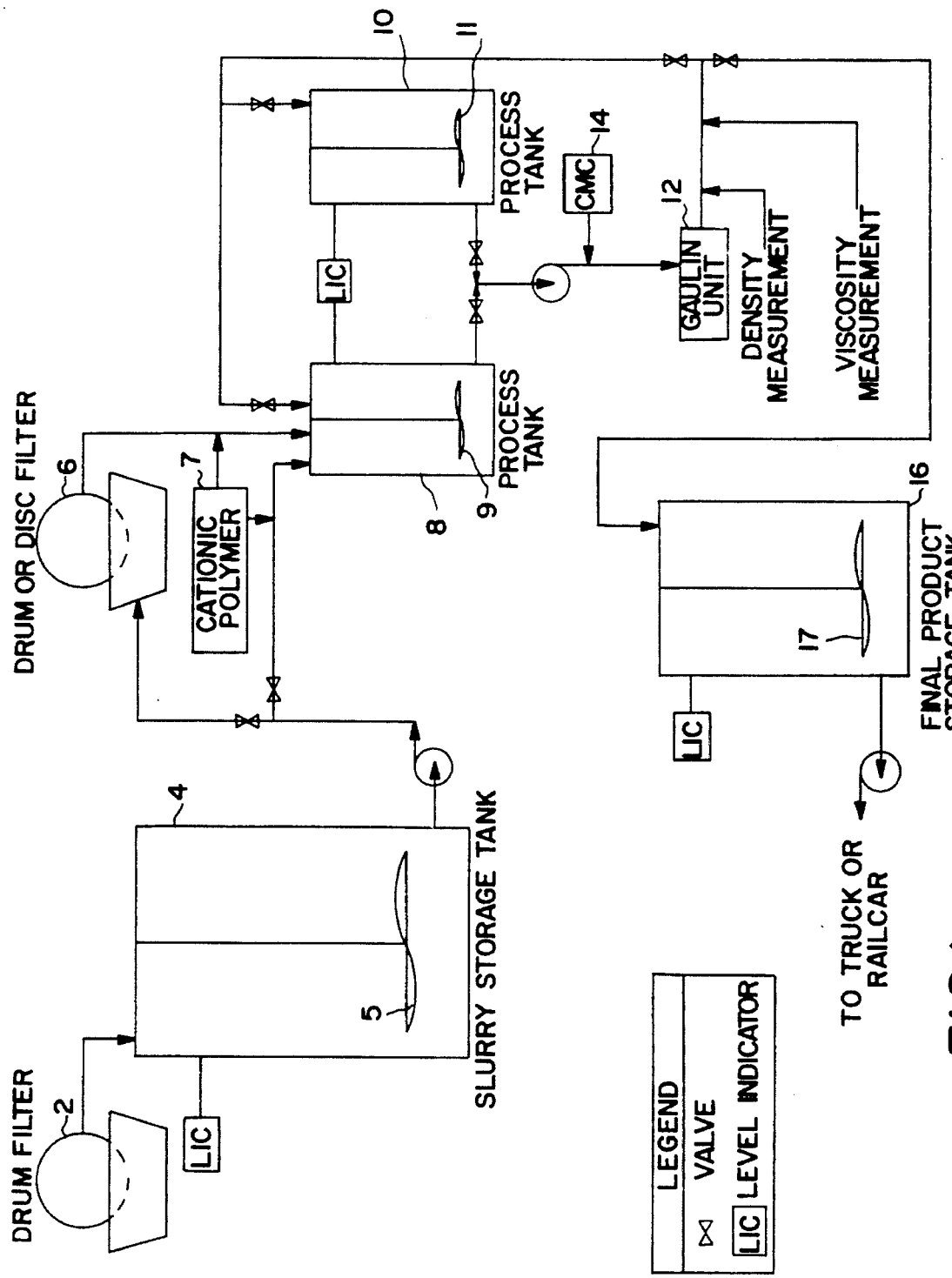
FIG. 1 is a schematic of a possible embodiment of the method of the present invention.

The method of the present invention for producing a stabilized magnesium hydroxide slurry comprises the following steps:

determining the chloride level of a starting magnesium hydroxide slurry;

adding between 0 and 5000 parts per million ("ppm"), of a cationic polymer to the starting slurry; wherein if the chloride level of the starting slurry is less than or equal to 0.42%, by weight on a MgO basis, 0 ppm of the cationic polymer is added to the starting slurry; if the chloride level of the starting slurry is 0.43–0.52%, by weight on a MgO basis, 1000 ppm of the cationic polymer are added to the starting slurry; if the chloride level of the starting slurry is 0.53–0.65%, by weight on a MgO basis, 2500 ppm of the cationic polymer are added to the starting slurry; and if the chloride level of the starting slurry is greater than or equal to 0.66%, by weight on a MgO basis, 3500–5000 ppm of the cationic polymer are added to the starting slurry;

physically deflocculating the magnesium hydroxide solids in the slurry, without homogenizing the slurry, to produce a stabilized magnesium hydroxide slurry. In a preferred embodiment of the method of the present invention, the method includes the additional step of adding a thickening agent in an amount of 1–100 ppm to the slurry to raise the viscosity of the slurry to a desired level.

The stabilized magnesium hydroxide slurry of the present invention comprises:

50–65%, by weight, deflocculated magnesium hydroxide solids; wherein the slurry will remain substantially free of agglomerated magnesium hydroxide solids for at least 30 days. Preferably the stabilized magnesium hydroxide slurry of the present invention also has one or more of the following properties: a viscosity of 50–1000 cps; a density of 1.4–1.6 g/cc; a mean particle size of the magnesium hydroxide solids of 1.7–5.0 microns, preferably 3–4 microns; and a chloride level of 0.30–0.75% by weight on a MgO basis, preferably 0.35–0.60 by weight on a MgO basis. The stabilized magnesium hydroxide slurry may also include up to 5000 parts per million (ppm) of a cationic polymer, wherein if the chloride level of the slurry is less than or equal to 0.42%, by weight on a MgO basis, the slurry includes 0 ppm of the cationic polymer; if the chloride level of the starting slurry is 0.43–0.52%, by weight on a MgO basis, the slurry may include 1000 ppm of the cationic polymer; if the chloride level of the starting slurry is 0.53–0.65%, by weight on a MgO basis, the slurry may include 2500 ppm of the cationic polymer; and if the chloride level of the starting slurry is greater than or equal to 0.66%, by weight on a MgO basis, the slurry may include 3500–5000 ppm of the cationic polymer. A preferred stabilized magnesium hydroxide slurry of the present invention additionally includes 1 to 100 ppm of a thickening agent which raises the viscosity of the slurry to a desired level.

The chloride level of the starting magnesium hydroxide slurry may be determined in any manner known to those of ordinary skill in the art including X-Ray Flouresence Spectrometry. The %, by weight on a MgO basis refers to the %, by weight chloride in comparison to the calculated %, by weight of MgO in the slurry solids.

The particle size of the magnesium hydroxide solides may be determined in any manner known to those of ordinary skill in the art, including X-Ray Monitored Sedimentation.

Suitable cationic polymers for use in the method and stabilized magnesium hydroxide slurry of the present invention include but are not limited to: Holly Fix 1, a cyanoguanidine polymeric resin manufactured and sold by Holly Oak Chemical, Inc., of Fountain Inn, S.C. and having a boiling point of 212° F. and a specific gravity of 1.186 @ 25° C. Additional suitable cationic polymers are known to those of ordinary skill in the art. While not wishing to be bound by any particular theory, it is believed that the cationic polymer assists in the deflocculation of higher chloride content starting magnesium hydroxide slurries by reducing the viscosity of the starting slurry to a point where the slurry may be physically deflocculated.

The physical deflocculation of the magnesium hydroxide solids in the starting magnesium hydroxide slurry may be accomplished by any means known to those of ordinary skill in the art, provided that minimal homogenization of the slurry occurs during the physical deflocculation step. Preferably, the slurry is physically deflocculated using an homogenizer wherein the operating conditions are controlled to minimize homogenization of the slurry but deflocculate substantially all of the magnesium hydroxide solids. A preferred homogenizer is an APV Gaulin Homogenizer, manufactured and sold by APV Gaulin, Wilmington, Mass. In order to physically deflocculate the magnesium hydroxide solids, the slurry is passed through the APV Gaulin Homogenizer, generally at a pressure of 1000–8000 pounds per square inch (psi). The slurry may be passed through the APV Gaulin Homogenizer 1–10 times. The term "pass" refers to a complete turnover of the slurry in the vessel. In the preferred method of operation, the slurry is passed through the APV Gaulin Homogenizer 3 times at approximately 2500 psi. An alternative method of operation is to recycle the slurry through the APV Gaulin Homogenizer instead of using discrete passes. A preferred recycling time, at approximately 2500 psi, is equivalent to 3.25 passes.

Suitable thickening agents for use in the method and stabilized magnesium hydroxide slurry of the present invention include, but are not limited to: CMC (carboxymethylcellulose), guar gum and xanthum gum.

The process and stabilized magnesium hydroxide slurry of the present invention will be described in more detail with reference to FIG. 1. Although, FIG. 1 depicts a particular embodiment of the process of the present invention, it should be understood that the process of the present invention is not limited to the particular embodiment depicted in FIG. 1.

Referring to FIG. 1, a starting magnesium hydroxide slurry having a solids content of approximately 50–60%, produced by a conventional process such as from well brines, is transferred from a drum filter unit, 2, utilized in producing the starting slurry, to slurry storage tank, 4. Slurry storage tank 4 contains agitation means 5, to minimize the agglomeration of the magnesium hydroxide solids in the starting slurry.

The chloride content of the starting slurry may be determined in the slurry storage tank, 4. The starting slurry is pumped from slurry storage tank 4, to process tanks 8 and 10. Optionally, the starting slurry may be pumped through drum or disc filter 6, prior to entering process tanks 8 and 10. Drum or disc filter 6, may be utilized if it is desired to further concentrate the starting slurry to raise the level of magnesium hydroxide solids.

Depending on the chloride content of the starting slurry a cationic polymer may be added to the slurry while the slurry is being pumped from storage tank 4 to process tanks 8 and 10. The addition of cationic polymer to the slurry is shown by box 7, in FIG. 1. If the chloride level of the starting slurry is less than or equal to 0.42%, by weight on a MgO basis, 0 ppm of the cationic polymer is added to the starting slurry; if the chloride level of the starting slurry is 0.43–0.52%, by weight on a MgO basis, 1000 ppm of the cationic polymer are added to the starting slurry; if the chloride level of the starting slurry is 0.53–0.65%, by weight on a MgO basis, 2500 ppm of the cationic polymer are added to the starting slurry; and if the chloride level of the starting slurry is greater than or equal to 0.66%, by weight on a MgO basis, 3500–5000 ppm of the cationic polymer are added to the starting slurry. The cationic polymer is evenly distributed throughout the starting slurry in process tanks 8 and 10 and during passes through the homogenizer.

From the process tanks 8 and 10 the slurry is pumped through homogenizer 12, which is preferably a APV Gaulin Homogenizer, manufactured and sold by APV Gaulin of Wilmington, Mass. The homogenizer 12, deflocculates the magnesium hydroxide solids in the slurry. The operating conditions of the homogenizer, and the number of times the slurry is passed through the homogenizer, should be sufficient to deflocculate substantially all of the magnesium hydroxide solids in the slurry. As described above, the slurry is passed through the APV Gaulin Homogenizer, generally at a pressure of 1000–8000 pounds per square inch (psi). The slurry may be passed through the APV Gaulin Homogenizer 12 and back into process tanks 8 and 10, one to ten times. In the preferred method of operation, the slurry is passed through the APV Gaulin Homogenizer 3 times at approximately 2500 psi. An alternative method of operation is to recycle the slurry through the APV Gaulin Homogenizer instead of using discrete passes. A preferred recycling time, at approximately 2500 psi, is equivalent to 3.25 passes.

Optionally, a thickening agent, such as CMC may be added to the slurry as the slurry is being passed through the homogenizer. The addition of a thickening agent to the slurry is shown by box 14 in FIG. 1. The amount of thickening agent added to the slurry is generally between 1 and 100 ppm, depending on the viscosity desired in the final stabilized magnesium hydroxide slurry.

After deflocculation has been completed, the stabilized magnesium hydroxide slurry is transferred from the homogenizer to final product storage tank 16. The final product storage tank 16 may contain means for agitating, 17, however such means are not necessary to keep the stabilized magnesium hydroxide slurry from settling. From storage tank 17 the stabilized magnesium hydroxide slurry of the present invention may be transferred to trucks or rail cars for transport.

The process described above, and depicted in FIG. 1, may be utilized to produce a stable magnesium hydroxide slurry having a solids content of 50 to 65%, by weight that will remain substantially free of agglomerated solids for at least 30 days. The slurry may also be characterized by one or more of the following characteristics: a viscosity of 50–1000 cps, a density of 1.4–1.6 g/cc, and a mean particle size of the magnesium hydroxide solids of 1.7–5.0 microns, preferably 34 microns; and a chloride level of 0.30–0.75% by weight on a MgO basis, preferably 0.35–0.60 by weight on a MgO basis; wherein substantially all of the magnesium hydroxide solids are deflocculated. The stable magnesium hydroxide slurry will remain substantially solid agglomerate free without agitation during transport. After a transportation period of up to 14 days the slurry will arrive at its final destination in a state wherein the slurry may be removed from the transport vessel by pumping, pressure or gravity without leaving a significant "heel" in the container. After transfer to a storage tank at the final destination, the stable magnesium hydroxide slurry will remain stable for up to 30 days without agitation, and remain stable indefinitely with agitation.

The following example will further illustrate the process and stabilized magnesium hydroxide slurry of the present invention.

EXAMPLE

This example illustrates the production of a stabilized magnesium hydroxide slurry of the present invention utilizing the process of the present invention.

A starting magnesium hydroxide slurry was produced by the chemical reaction of dolime and well brine. The dolime was obtained from dolomitic limestone which was quarried, crushed and calcined in kilns to produce dolime as follows:

$$MgCO_3 \cdot CaCO_3 \rightarrow MgO \cdot CaO + CO_2.$$

The dolime was reacted with well brine to produce a magnesium hydroxide slurry as follows:

$$MgO \cdot CaO + H_2O \rightarrow MgO + Ca(OH)_2$$

$$Ca(OH)_2 + MgCl_2 \rightarrow Mg(OH)_2 + CaCl_2$$

$$MgO + H_2O \rightarrow Mg(OH)_2.$$

The magnesium hydroxide slurry which was at this stage in an enriched calcium chloride liquor was thickened/settled, washed relatively free of chlorides, further concentrated to approximately 56%, by weight, solids and transferred to a storage vessel. At this stage the viscosity of the slurry was approximately 2000 centipoise. The magnesium hydroxide slurry thus produced, formed the starting slurry for the method of the present invention.

The chloride concentration of the starting slurry was determined by X-Ray Flouresence Spectrometry to be 0.48%, by weight on a MgO basis. Based on this chloride level, 1000 ppm of Holly Fix 1 cationic polymer were added to the starting slurry as the slurry was pumped from the storage vessel into process vessels. From the process vessels, the magnesium hydroxide solids in the cationic polymer containing slurry were deflocculated using an APV Gaulin homogenizer at 2500 psi pressure. The slurry was passed from the process vessels through the APV Gaulin homogenizer three times. While the slurry was being passed through the homogenizer, 10 ppm of carboxymethylcellulose was added to the slurry.

After the final pass through the homogenizer, the stabilized magnesium hydroxide slurry thus formed was transferred to a storage vessel. The final stabilized magnesium hydroxide slurry comprised 56%, by weight, deflocculated magnesium hydroxide solids, 1000 ppm cationic polymer and 10 ppm CMC and had a viscosity of 150 centipoise and a density of 1.48 g/cc. The mean particle size of the magnesium hydroxide solids in the stabilized magnesium hydroxide slurry was 3.48 microns as determined by X-Ray Monitored Sedimentation using a MicroMeritics Model 5100 Sedigraph.

The stabilized magnesium hydroxide slurry could be transferred to rail cars, which may be fitted with an air sparger system, and transported for up to 14 days without agitation. After arriving at its final destination, the stabilized magnesium hydroxide slurry could be removed from the rail cars by pumping. If any settling has occurred the rail cars may be sparged prior to pumping. After the stabilized magnesium hydroxide slurry is pumped out the rail cars will be substantially free of agglomerated magnesium hydroxide solids ("heel").

After transport, the stabilized magnesium hydroxide slurry could be stored in a storage vessel wherein it will remain substantially agglomeration free, without agitation, for 30 days.

We claim:

1. A method for producing a stabilized magnesium hydroxide slurry comprising:

provididng a starting magnesium hydroxide slurry including loose agglomerations of magnesium hydroxide solids, said slurry having a chloride content of 0.43–0.75% by weight on an MgO basis and having a viscosity which enables substantially all of the magnesium hydroxide solids in the slurry to be physically deflocculated, said magnesium hydroxide solids comprising 50 to 60%, by weight, of the slurry;

adding Holly Fix 1, a cationic polymer, to said starting slurry; and physically deflocculating the magnesium hydroxide solids to produce a magnesium hydroxide slurry that is stabilized such that any settlement that occurs is resuspendable by air sparging within a period of 30 days from production.

2. The method of claim 1 further comprising: adding a thickening agent to the deflocculated slurry in an amount of 1 to 100 ppm.

3. The method of claim 2 wherein the thickening agent is selected from the group consisting of carboxymethylcellulose, xanthum gum and guar gum.

4. The method of claim 1, wherein the chloride level of the starting slurry is 0.43–0.52%, by weight on a MgO basis, and 1000 ppm of the Holly Fix 1 are added to the starting slurry.

5. The method of claim 1, wherein the chloride level of the starting slurry is 0.53–0.65%, by weight on a MgO basis, and 2500 ppm of the Holly Fix 1 are added to the starting slurry.

6. The method of claim 1, wherein the chloride level of the starting slurry is 0.66–0.75%, by weight on a MgO basis, and 3500–5000 ppm of the Holly Fix 1 are added to the starting slurry.

7. A stabilized magnesium hydroxide slurry comprised of about 50 to 60%, by weight, deflocculated magnesium hydroxide solids, 0.43–0.75% by weight chloride on a MgO basis, and Holly Fix 1, a cationic polymer, said magnesium hydroxide solids suspended within the slurry such that any settlement that occurs is resuspendable by air sparging within a period of 30 days from production.

8. The stabilized magnesium hydroxide slurry of claim 7 wherein the viscosity of the slurry is 50–1000 cps.

9. The stabilized magnesium hydroxide slurry of claim 8 wherein the density of the slurry is 1.4–1.6 g/cc.

10. The stabilized magnesium hydroxide slurry of claim 8 wherein the particle size of the magnesium hydroxide solids is 1.7–5.0 microns.

11. The stabilized magnesium hydroxide slurry of claim 10 further comprising a thickening agent in an mount of 1–100 ppm.

12. The stabilized magnesium hydroxide slurry of claim 7, wherein said slurry comprises 0.43–0.52% chloride, by weight on a MgO basis, and 1000 ppm of the Holly Fix 1.

13. The stabilized magnesium hydroxide slurry of claim 7, wherein said slurry comprises 0.53–0.65% chloride, by weight on a MgO basis, and 2500 ppm of the Holly Fix 1.

14. The stabilized magnesium hydroxide slurry of claim 7, wherein said slurry comprises 0.66–0.75% chloride, by weight on a MgO basis, and 3500–5000 ppm of the Holly Fix 1.

15. A stabilized magnesium hydroxide slurry produced by the process of:

providing a starting magnesium hydroxide slurry including loose agglomerations of magnesium hydroxide solids, said slurry having a chloride content of 0.43–0.75% by weight on an MgO basis and having a viscosity which enables substantially all of the magnesium hydroxide solids in the slurry to be physically deflocculated, said magnesium hydroxide solids comprising 50 to 60%, by weight, of the slurry;

adding Holly Fix 1, a cationic polymer, to said starting slurry; and physically deflocculating the magnesium hydroxide solids in the slurry to produce a magnesium hydroxide slurry that is stabilized such that any settlement that occurs is resuspendable by air sparging within a period of 30 days from production.

16. The stabilized magnesium hydroxide slurry of claim 14 wherein the process for producing the slurry further comprises adding a thickening agent to the deflocculated slurry in an amount of 1–100 ppm.

17. The stabilized magnesium hydroxide slurry of claim 15, wherein the chloride level of the starting slurry is 0.43–0.52%, by weight on a MgO basis, and 1000 ppm of the Holly Fix 1 are added to the starting slurry.

18. The stabilized magnesium hydroxide slurry of claim 15, wherein the chloride level of the starting slurry is 0.53–0.65%, by weight on a MgO basis, and 2500 ppm of the Holly Fix 1 are added to the starting slurry.

19. The stabilized magnesium hydroxide slurry of claim 15, wherein the chloride level of the starting slurry is 0.66–0.75%, by weight on a MgO basis, and 3500–5000 ppm of the Holly Fix 1 are added to the starting slurry.

* * * * *